United States Patent
Hu et al.

(10) Patent No.: US 11,417,890 B2
(45) Date of Patent: Aug. 16, 2022

(54) FLEXIBLE BATTERY ASSEMBLY AND METHOD FOR MANUFACTURING THE SAME

(71) Applicants: Avary Holding (Shenzhen) Co., Limited., Shenzhen (CN); QING DING PRECISION ELECTRONICS (HUAIAN) CO., LTD, Huai an (CN)

(72) Inventors: Xian-Qin Hu, Shenzhen (CN); Hsiao-Ting Hsu, New Taipei (TW)

(73) Assignees: Avary Holding (Shenzhen) Co., Limited., Shenzhen (CN); QING DING PRECISION ELECTRONICS (HUAIAN) CO., LTD, Huai an (CN)

( * ) Notice: Subject to any disclaimer, the term of this patent is extended or adjusted under 35 U.S.C. 154(b) by 234 days.

(21) Appl. No.: 16/699,966

(22) Filed: Dec. 2, 2019

(65) Prior Publication Data

US 2021/0119222 A1 Apr. 22, 2021

(30) Foreign Application Priority Data

Oct. 21, 2019 (CN) .......................... 201911002155.8

(51) Int. Cl.
*H01M 4/66* (2006.01)
*H01M 4/139* (2010.01)
(Continued)

(52) U.S. Cl.
CPC .......... *H01M 4/668* (2013.01); *H01M 4/139* (2013.01); *H01M 4/667* (2013.01); *H01M 4/74* (2013.01);
(Continued)

(58) Field of Classification Search
CPC ........ H01M 4/668; H01M 4/66; H01M 4/139; H01M 4/667; H01M 4/74; H01M 10/0525; H01M 10/0585
See application file for complete search history.

(56) References Cited

U.S. PATENT DOCUMENTS

| 7,939,195 | B2 * | 5/2011 | Salot | ................... | H01M 4/0428 |
| | | | | | 429/162 |
| 2002/0092558 | A1 * | 7/2002 | Kim | ........................ | H02S 40/38 |
| | | | | | 136/244 |

(Continued)

FOREIGN PATENT DOCUMENTS

| CN | 101779312 A | 7/2010 |
| CN | 108365271 A | 8/2018 |
| WO | 2016204324 A1 | 12/2016 |

*Primary Examiner* — Maria Laios
*Assistant Examiner* — Adam J Francis
(74) *Attorney, Agent, or Firm* — ScienBiziP, P.C.

(57) ABSTRACT

A flexible battery assembly includes a positive plate, a first filling film, a separator, a second filling film, and a negative plate stacked in order. The positive plate includes a first insulating layer, spaced first current collectors, and a positive electrode active layer. The negative plate includes a second insulating layer, spaced second current collectors, and a negative electrode active layer. Each first current collector corresponds to one second current collector. The first filling film comprises first openings each corresponding to one first current collector, and the first current collectors are embedded in the first openings. The second filling film comprises second openings each corresponding to one second current collector, and the second current collectors are embedded in the second openings. An electrolyte is sealed in the first openings and the second openings. A method for manufacturing such flexible battery assembly is also disclosed.

16 Claims, 6 Drawing Sheets

(51) Int. Cl.
*H01M 10/0585* (2010.01)
*H01M 10/0525* (2010.01)
*H01M 4/74* (2006.01)

(52) U.S. Cl.
CPC ... *H01M 10/0525* (2013.01); *H01M 10/0585* (2013.01)

(56) References Cited

U.S. PATENT DOCUMENTS

| | | | |
|---|---|---|---|
| 2010/0209784 A1* | 8/2010 | Yamazaki | H01M 4/13 429/338 |
| 2010/0310961 A1* | 12/2010 | Clark | H01M 8/1286 429/452 |
| 2012/0115026 A1* | 5/2012 | Ramasubramanian | H01M 4/366 429/209 |
| 2013/0149605 A1* | 6/2013 | Kakehata | H01M 4/0457 429/211 |
| 2016/0372799 A1* | 12/2016 | Watanabe | H01M 50/198 |
| 2017/0279108 A1* | 9/2017 | Herle | H01M 4/139 |

\* cited by examiner

FLEXIBLE BATTERY ASSEMBLY AND METHOD FOR MANUFACTURING THE SAME

FIELD

The subject matter herein generally relates to batteries, in particular, to a flexible battery assembly and a method for manufacturing the flexible battery assembly.

BACKGROUND

Rechargeable lithium-ion batteries are widely used in portable instruments because of their high voltage, light weight, high energy density, and low self-discharge. However, manufacturing methods for current batteries are cumbersome.

Therefore, there is room for improvement within the art.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
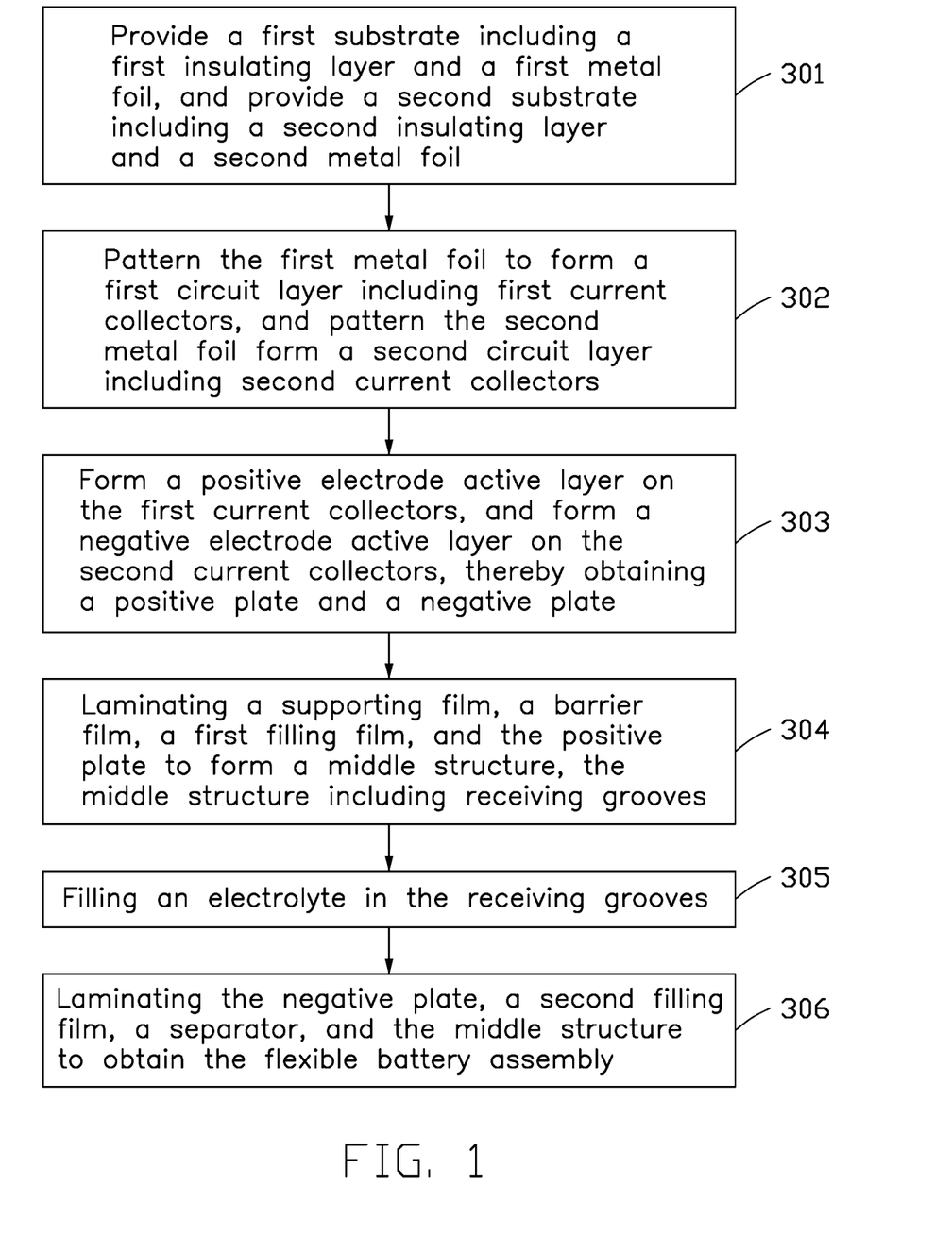
FIG. 1 is a flowchart of an embodiment of a method for manufacturing a flexible battery assembly.

FIG. 1 illustrates a flowchart of a method in accordance with an embodiment. The method for manufacturing a flexible battery assembly 100 (shown in FIG. 8) is provided by way of embodiments, as there are a variety of ways to carry out the method. Each block shown in FIG. 1 represents one or more processes, methods, or subroutines carried out in the method. Furthermore, the illustrated order of blocks can be changed. Additional blocks may be added or fewer blocks may be utilized, without departing from this disclosure. The method can begin at block 301.

Figure 2:
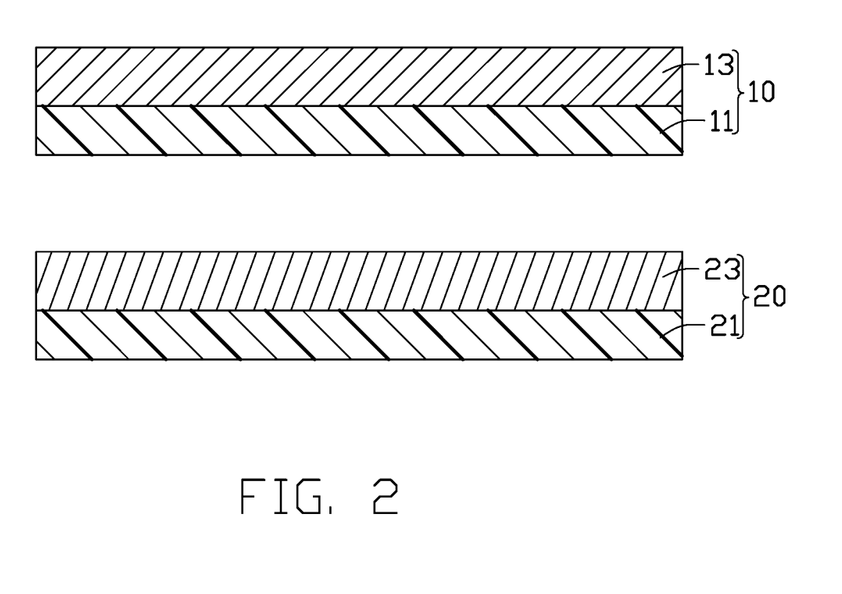
FIG. 2 is a cross-sectional view of an embodiment of a first substrate including a first insulating layer and a first metal foil, and a second substrate including a second insulating layer and a second metal foil.

At block 301, referring to FIG. 2, a first substrate 10 and a second substrate 20 are provided. The first substrate 10 includes a first insulating layer 11 and a first metal foil 13 formed on a surface of the first insulating layer 11. The second substrate 20 includes a second insulating layer 21 and a second metal foil 23 formed on a surface of the second insulating layer 21.

The first metal foil 13 is made of a material commonly used in the art as a positive electrode current collector, such as aluminum foil. The second metal foil 23 is made of a material commonly used in the art as a negative electrode current collector, such as copper foil.

The first insulating layer 11 and the second insulating layer 21 may be made of the same material, or may be made of different materials.

Figure 3:
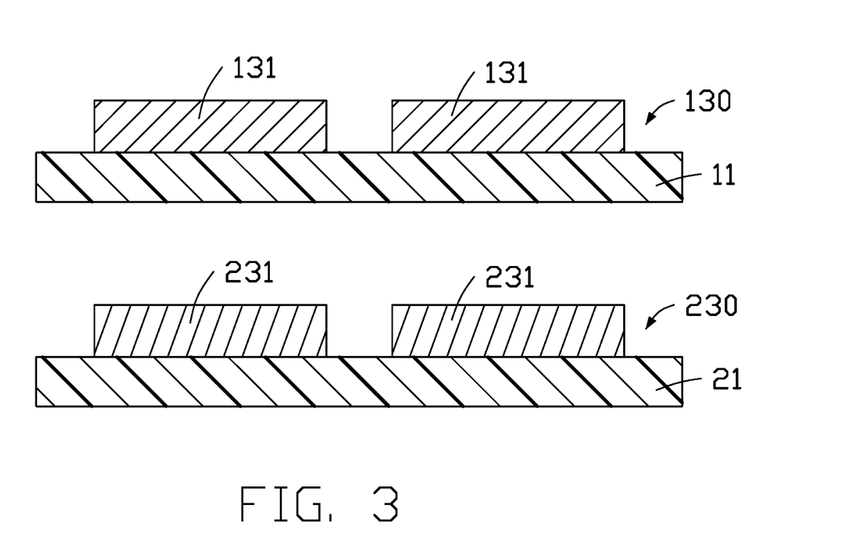
FIG. 3 is a cross-sectional view showing a first circuit layer and a second circuit layer patterned by the first metal foil and the second metal foil of FIG. 2.

At block 302, referring to FIG. 3, a first circuit layer 130 is patterned by the first metal foil 13, a second circuit layer 230 is patterned by the second metal foil 23. The first circuit layer 130 includes a plurality of spaced first current collectors 131. The second circuit layer 230 includes a plurality of spaced second current collectors 231.

Figure 4:
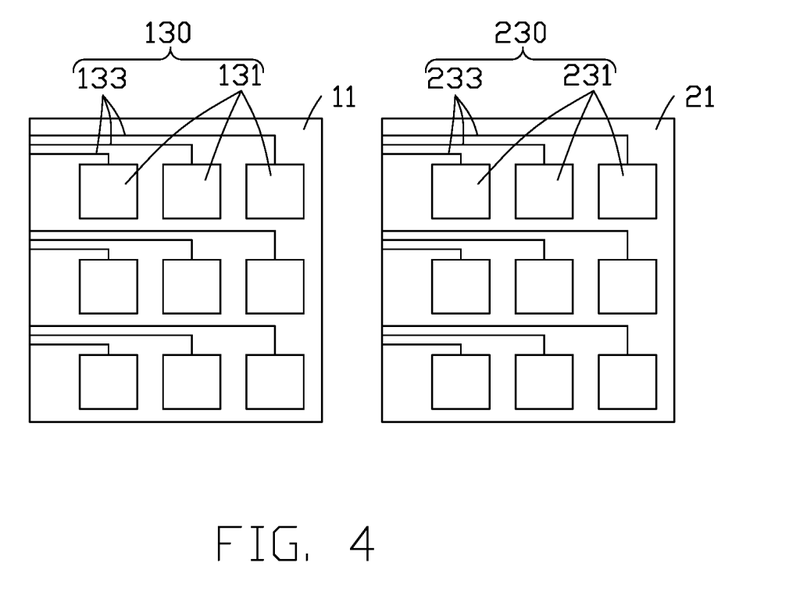
FIG. 4 is a cross-sectional view showing a plurality of first wires and a plurality of second wires of the first and the second circuit layers of FIG. 3.

In at least one embodiment, referring to FIG. 4, the first circuit layer 130 may further include a plurality of first wires 133, and each first wire 133 is connected to one of the first current collectors 131. The second circuit layer 230 may further include a plurality of second wires 233, and each second wire 233 is connected to one of the second current collectors 231.

Figure 5:
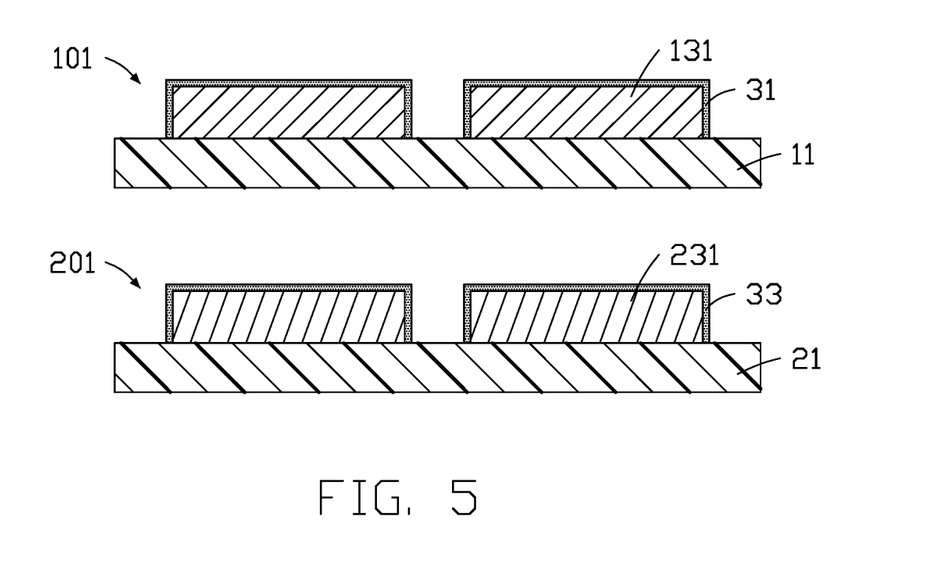
FIG. 5 is a cross-sectional view of an embodiment of a positive plate and a negative plate.

At block 303, referring to FIG. 5, a positive electrode active layer 31 is formed on the first current collectors 131, and a negative electrode active layer 33 is formed on the second current collectors 231, thereby forming a positive plate 101 by the first substrate 10 and forming a negative plate 201 by the second substrate 20.

In at least one embodiment, the positive electrode active layer 31 and the negative electrode active layer 33 are formed by coating, printing, or spraying.

Figure 6:
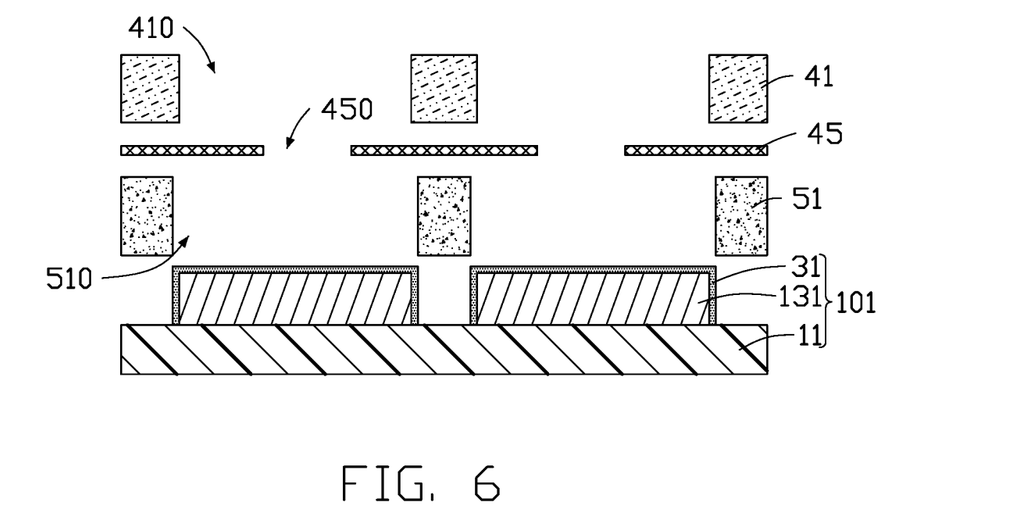
FIG. 6 is a cross-sectional view showing a supporting film, a barrier film, a first filling film, and the positive plate of FIG. 5 stacked in said order.
Figure 7:
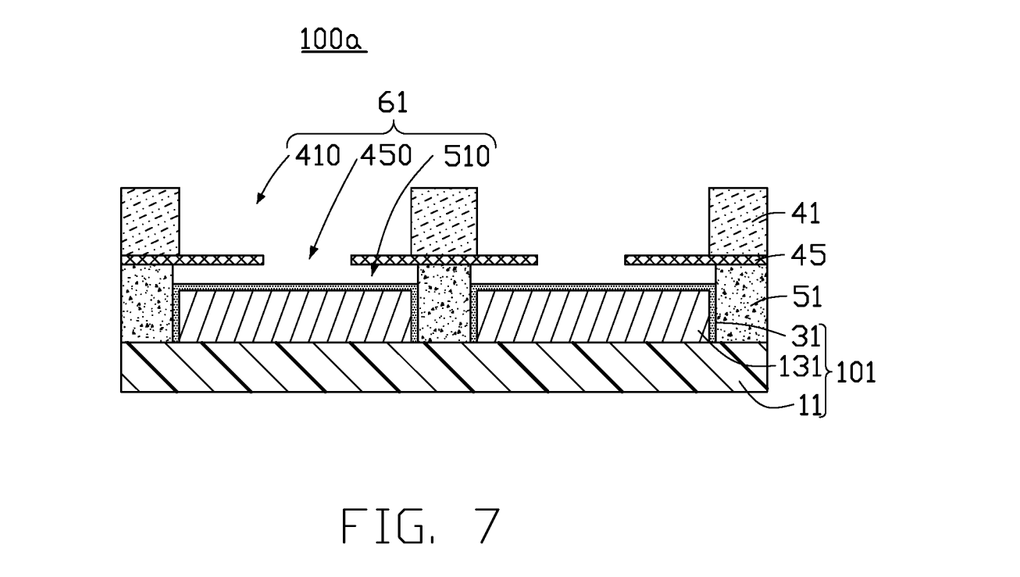
FIG. 7 is a cross-sectional view of an embodiment of a middle structure.

At block 304, referring to FIGS. 6 and 7, a supporting film 41, a barrier film 45, a first filling film 51, and the positive plate 101 are laminated sequentially to form a middle structure 100a. A plurality of first openings 510 is defined in the first filling film 51. Each first opening 510 corresponds to one of the first current collectors 131, so that the first filling film 51 is embedded in a gap of the first circuit layer 130 to surround each first current collector 131 and separate the first current collectors 131 from each other. A plurality of fourth openings 450 is defined in the barrier film 45. Each fourth opening 450 corresponds to one of the first current collectors 131. A plurality of third openings 410 is defined in the supporting film 41. Each third opening 410 corresponds to one of the first current collectors 131. Each fourth opening 450 communicates with the corresponding first opening 510 and the corresponding third opening 410 to form a receiving groove 61.

In at least one embodiment, the supporting film 41 may be a polypropylene film. The barrier film 45 may be a polyimide film. The first filling film 51 may be a polypropylene film or may be made of butadiene-styrene copolymer.

In at least one embodiment, a thickness of the first filling film 51 is greater than or equal to a thickness of each first current collector 131.

A size of each fourth opening 450 is less than a size of the corresponding first opening 510, and also less than a size of the corresponding third opening 410.

In at least one embodiment, the barrier film 45 may have a thickness of 7.5 μm to 35 μm. Each fourth opening 450 may have a size of 20 μm to 60 μm.

Figure 8:
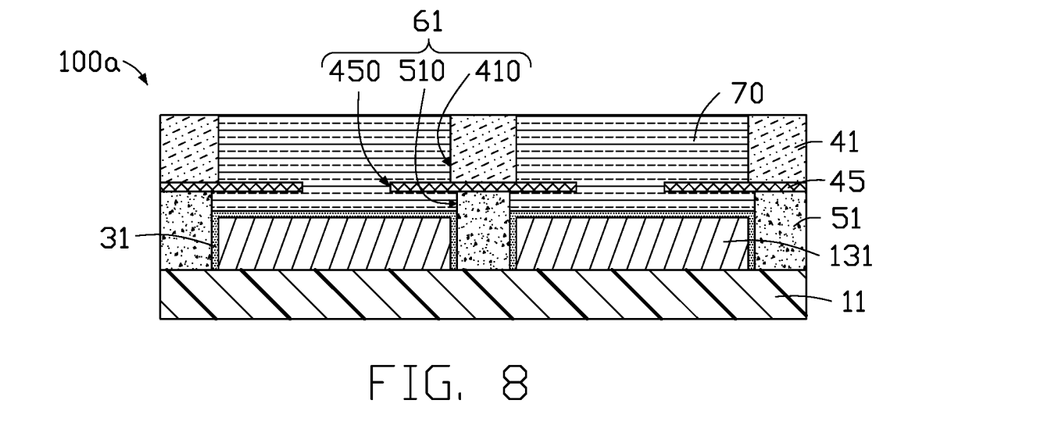
FIG. 8 is a cross-sectional view showing an electrolyte filled in the middle structure of FIG. 7.

At block 305, referring to FIG. 8, an electrolyte 70 is infilled in the receiving grooves 61.

In at least one embodiment, the electrolyte 70 is infilled in the receiving grooves 61 by printing. In another embodiment, the electrolyte 70 may be infilled in the receiving grooves 61 by other means, such as injecting.

In at least one embodiment, the electrolyte 70 includes a lithium salt and an aprotic solvent. The lithium salt may be selected from a group consisting of $LiClO_4$, $LiBF_4$, $LiAsF_6$, $LiPF_6$, and $LiCF_3SO_3$, and any combination thereof. The aprotic solvent may be selected from a group consisting of ethylene carbonate, polycarbonate, dimethyl carbonate, diethyl carbonate, and any combination thereof. The electrolyte 70 may further include a gel polymer, polysiloxane, and a copolymer. The gel polymer may be carrageenan, alginic acid, or cellulose. The copolymer may be a polyether-based copolymer or a polycarbonate-based copolymer.

Figure 9:
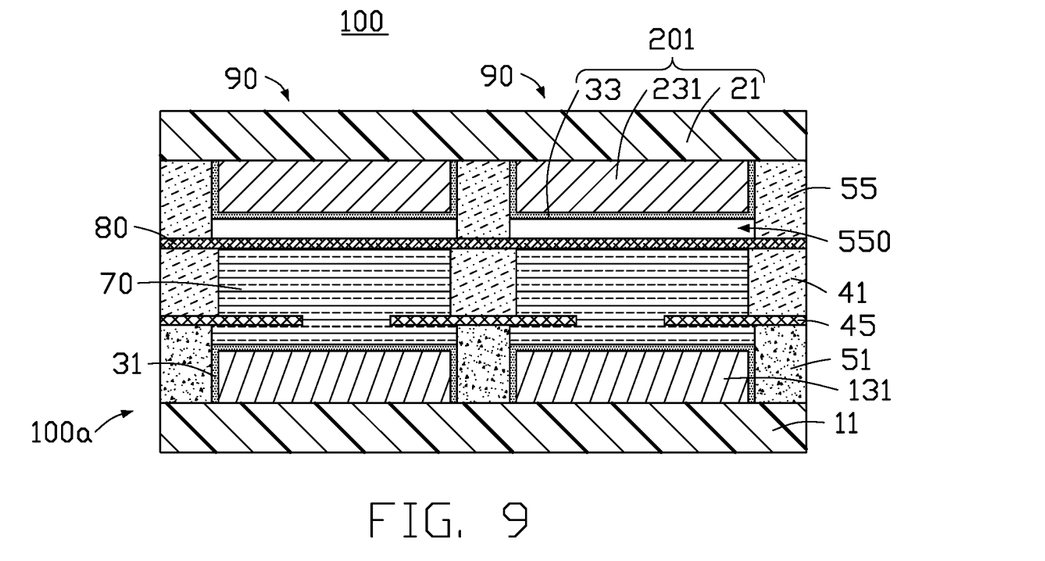
FIG. 9 is a cross-sectional view showing the negative plate of FIG. 5, a second filling film, a separator, and the middle structure of FIG. 7 laminated to form a flexible battery assembly.

At block 306, referring to FIG. 9, the negative plate 201, a second filling film 55, a separator 80, and the middle structure 100a with the electrolyte 70 are laminated sequentially to obtain the flexible battery assembly 100. The flexible battery assembly 100 includes a plurality of sub-battery structures 90. A plurality of second openings 550 is defined in the second filling film 55. Each second opening 550 corresponds to one of the second current collectors 231, so that the second filling film 55 is embedded in a gap of the second circuit layer 230 to surround each second current collector 231 and separate the second current collectors 231 from each other. Each second opening 550 also corresponds to one of the receiving grooves 61. The separator 80 partitions the second opening 550 and the corresponding receiving groove 61. In the flexible battery assembly 100, the second opening 550 and the corresponding receiving groove 61 together form a sealed cavity (not shown).

In at least one embodiment, the second filling film 55 may be a polypropylene film. The separator 80 may be a polypropylene film, a polyethylene film, or a film composed of polypropylene and polyethylene.

In at least one embodiment, a thickness of the second filling film 55 is greater than a thickness of each second current collector 231.

In at least one embodiment, the method may further include cutting the flexible battery assembly 100 obtained at block 308 to obtain a battery assembly with a desired shape and the desired number of sub-battery structures.

Figure 10:
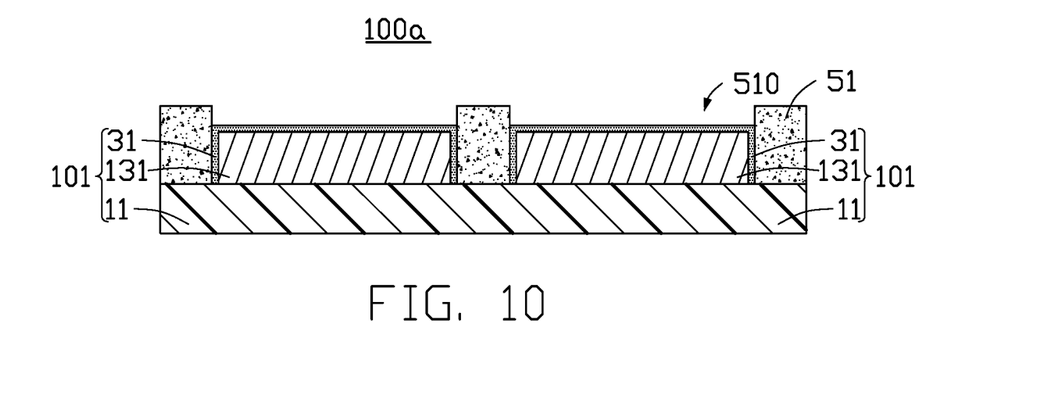
FIG. 10 is a cross-sectional view of another embodiment of a middle structure.

In at least one embodiment, referring to FIG. 10, the supporting film 41 and the barrier film 45 at block 304 may be omitted, a first filling film 51 and the positive plate 101 are laminated to form a middle structure 100a. Each first opening 510 forms one receiving grove 61, and the thickness of the first filling film 51 is greater than the thickness of each first current collector 131.

In at least one embodiment, the flexible battery assembly 100 may include one sub-battery structure.

Depending on the embodiment, certain of the steps of methods described may be removed, others may be added, and the sequence of steps may be altered. It is also to be understood that the description and the claims drawn to a method may include some indication in reference to sequential steps. However, the indication used is only to be viewed for identification purposes and not as a suggestion as to an order for the steps.

Figure 11:
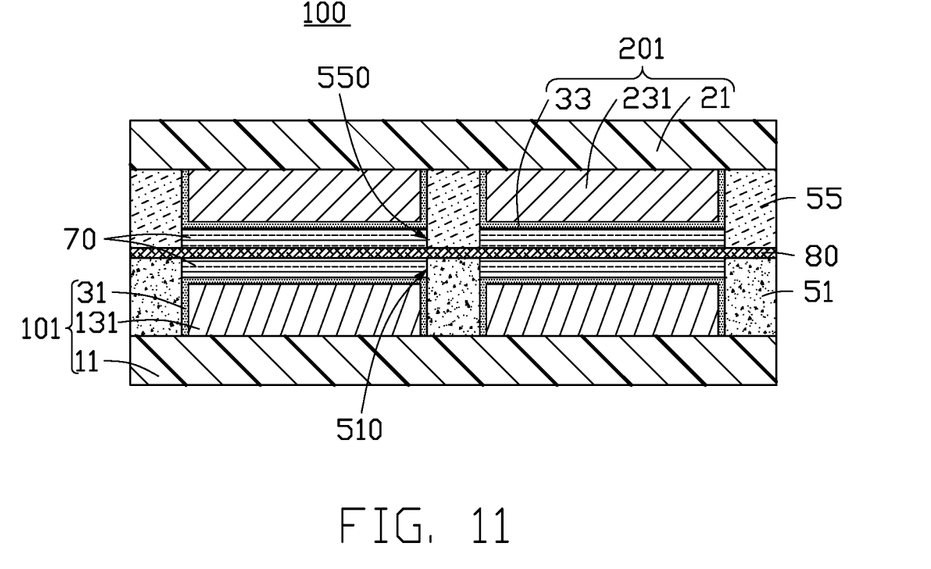
FIG. 11 is a cross-sectional view of an embodiment of a flexible battery assembly.

FIG. 11 illustrates an embodiment of a flexible battery assembly 100. The flexible battery assembly 100 includes a positive plate 101, a first filling film 51, a separator 80, a second filling film 55, and a negative plate 201 stacked in order. The positive plate 101 includes a first insulating layer 11, a plurality of spaced first current collectors 131 formed on a surface of the first insulating layer 11, and a positive electrode active layer 31 covering the first current collectors 131. The negative plate 201 includes a second insulating layer 21, a plurality of spaced second current collectors 231 formed on a surface of the second insulating layer 21, and a negative electrode active layer 33 covering the second current collectors 231. Each first current collector 131 corresponds to one of the second current collectors 231. A plurality of first openings 510 is defined in the first filling film 51. Each first opening 510 corresponds to one of the first current collectors 131, and the first current collectors 131 are embedded in the first openings 510. A plurality of second openings 550 is defined in the second filling film 55. Each second opening 550 corresponds to one of the second current collectors 231, and the second current collectors 231 are embedded in the second openings 550. The flexible battery assembly 100 further includes an electrolyte 70 sealed in the first openings 510 and the second openings 550.

In at least one embodiment, a thickness of the first filling film 51 is greater than or equal to a thickness of each first current collector 131. A thickness of the second filling film 55 is greater than a thickness of each second current collector 231.

The first insulating layer 11 and the second insulating layer 21 may be made of the same material, or may be made of different materials.

The first filling film 51 may be a polypropylene film or may be made of butadiene-styrene copolymer. The second filling film 55 may be a polypropylene film. The separator 80 may be a polypropylene film, a polyethylene film, or a film composed of polypropylene and polyethylene.

In at least one embodiment, the electrolyte 70 includes a lithium salt and an aprotic solvent. The lithium salt may be selected from a group consisting of $LiClO_4$, $LiBF_4$, $LiAsF_6$, $LiPF_6$, and $LiCF_3SO_3$, and any combination thereof. The aprotic solvent may be selected from a group consisting of ethylene carbonate, polycarbonate, dimethyl carbonate, diethyl carbonate, and any combination thereof. The electrolyte 70 may further include a gel polymer, polysiloxane, and a copolymer. The gel polymer may be carrageenan, alginic acid, or cellulose. The copolymer may be a polyether-based copolymer or a polycarbonate-based copolymer.

In at least one embodiment, referring to FIG. 4, the positive plate 101 may further include a plurality of first wires 133, and each first wire 133 is connected to one of the first current collectors 131. The negative plate 201 may further include a plurality of second wires 233, and each second wire 233 is connected to one of the second current collectors 231. The first wires 133 and the second wires 233 are used to connect other electronic components, such as mainboard.

Figure 12:
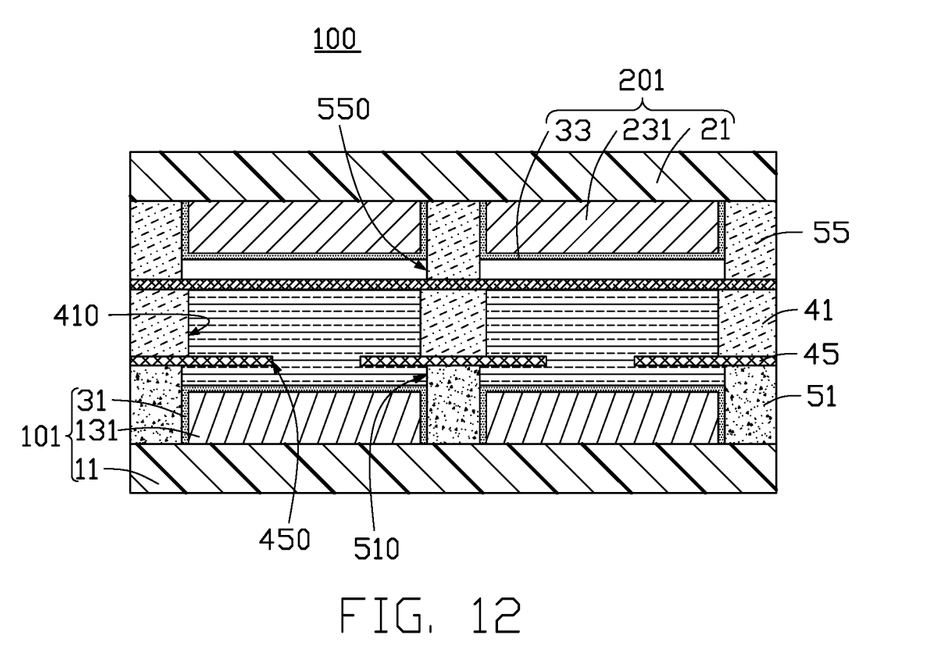
FIG. 12 is a cross-sectional view of another embodiment of a flexible battery assembly.

In at least one embodiment, referring to FIG. 12, the flexible battery assembly 100 may further include a supporting film 41 and a barrier film 45 stacked in order. A side of the supporting film 41 facing away from the barrier film 45 is combined with the separator 80. A side of the barrier film 45 facing away from the supporting film 41 is combined with the second filling film 55. A plurality of third openings 410 is defined in the supporting film 41. Each third opening 410 corresponds to one of the first openings 510. A plurality of fourth openings 450 is defined in the barrier film 45. Each fourth opening 450 corresponds to one of the second openings 550. Each fourth opening 450 communicates with the corresponding third opening 410.

In at least one embodiment, the supporting film 41 may be a polypropylene film. The barrier film 45 may be a polyimide film.

A size of each fourth opening 450 is less than a size of the corresponding first opening 510, and also less than a size of the corresponding third opening 410. The fourth openings 450 reduce pressure caused by lithium accumulation on the separator 80. The barrier film 45 may have a thickness of 7.5 μm to 35 μm. Each fourth opening 450 may have a size of 20 μm to 60 μm.

In at least one embodiment, the positive plate 101 may include one first current collector 131, the negative plate 201 may include one second current collector 231, so that the flexible battery assembly 100 may include only one sub-battery structure.

The method for manufacturing the flexible battery assembly has a simple process and is easy to operate. The flexible battery assembly manufactured by the above method can include a plurality of sub-battery structures, avoiding mutual interference between the sub-battery structures. The safety of the flexible battery assembly is improved. In addition, the flexible battery assembly manufactured by the above method can be tailored as needed to obtain a battery assembly with a desired shape and a desired number of sub-battery structures.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for manufacturing a flexible battery assembly comprising:
   providing a positive plate comprising a first insulating layer, a positive electrode active layer, and a first circuit layer formed on the first insulating layer, wherein the first circuit layer comprises a plurality of first current collectors, the plurality of first current collectors are spaced apart from each other, the positive electrode active layer covers each of the first current collectors;
   laminating a first filling film and the positive plate to form a middle structure, wherein the first filling film comprises a plurality of first openings, each of the first openings corresponds to one of the first current collectors, the first filling film is embedded in a gap of the first circuit layer to surround each of the first current collectors, and the first current collectors are separated from each other by the first filling film;
   filling an electrolyte into each of the plurality of first openings;
   providing a negative plate comprising a second insulating layer, a negative electrode active layer, and a second circuit layer formed on the second insulating layer, wherein the second circuit layer comprises a plurality of second current collectors, the plurality of the second current collectors are spaced apart from each other, the negative electrode active layer covers each of the plurality of second current collectors; and
   laminating the negative plate, a second filling film, a separator, and the middle structure with the electrolyte in said order to form the flexible battery assembly, wherein the second filling film comprises a plurality of second openings, each of the second openings corresponds to one of the second current collectors, the second filling film is embedded in a gap of the second circuit layer to surround each of the second current collectors, the second current collectors are separated from each other by the second filling film, each of the second openings corresponds to a corresponding one of the first openings, the separator is combined with a side of the first filling film facing away from the first insulating layer to partition each of the second openings and the corresponding one of the first openings.

2. The method for manufacturing the flexible battery assembly of claim 1, wherein the first circuit layer comprises a plurality of first wires, each of the first wires is connected to one of the first current collectors; the second circuit layer comprises a plurality of second wires, each of the second wires is connected to one of the second current collectors.

3. The method for manufacturing the flexible battery assembly of claim 2, wherein the method of providing the positive plate further comprises:
   providing a first substrate comprising the first insulating layer and a first metal foil formed on the first insulating layer;
   patterning the first metal foil to form the first circuit layer, wherein the first circuit layer comprises the plurality of first current collectors and the plurality of first wires, each of the first wires is connected to one of the first current collectors; and
   forming the positive electrode active layer on the first current collectors, thereby obtaining the positive plate.

4. The method for manufacturing the flexible battery assembly of claim 2, wherein the method of providing the negative plate further comprises:
   providing a second substrate comprising the second insulating layer and a second metal foil formed on the second insulating layer;
   patterning the second metal foil to form the second circuit layer, wherein the second circuit layer comprises the plurality of second current collectors and the plurality of second wires, each of the second wires is connected to one of the second current collectors; and
   forming the negative electrode active layer on the second current collectors, thereby obtaining the negative plate.

5. The method for manufacturing the flexible battery assembly of claim 1, wherein a thickness of the first filling film is greater than or equal to a thickness of each of the first current collectors, a thickness of the second filling film is greater than a thickness of each of the second current collectors.

6. The method for manufacturing the flexible battery assembly of claim 1, wherein the method of forming the middle structure comprises:

laminating a supporting film, a barrier film, the first filling film, and the positive plate in said order, wherein the first filling film comprises the plurality of first openings, each of the first openings corresponds to one of the first current collectors, the first filling film is embedded in the gap of the first circuit layer to surround each of the first current collectors, the first current collectors are separated from each other by the first filling film, the supporting film comprises a plurality of third openings, each of the third openings corresponds to a corresponding one of the first current collectors, the barrier film comprises a plurality of fourth openings, each of the fourth openings corresponds to a corresponding one of the first current collectors, each of the fourth openings communicates with the corresponding one of the third openings and the corresponding one of the first openings to form a receiving groove;

the flexible battery assembly is formed by laminating the negative plate, the second filling film, the separator, and the middle structure with the electrolyte are laminated in said order so that each of the receiving groove corresponds to a corresponding one of the second openings, a side of the separator is combined with a side of the supporting film facing away from the first insulating layer to partition each of the second openings and the corresponding one of the receiving grooves.

7. The method for manufacturing the flexible battery assembly of claim 6, wherein a size of each of the fourth openings is less than a size of the corresponding one of the first openings, and also less than a size of the corresponding one of the third openings.

8. The method for manufacturing the flexible battery assembly of claim 6, wherein the barrier film has a thickness of 7.5 μm to 35 μm.

9. The method for manufacturing the flexible battery assembly of claim 6, wherein a size of each of the fourth openings is in a range of 20 μm to 60 μm.

10. A flexible battery assembly comprising:

a positive plate comprising a first insulating layer, a plurality of first current collectors formed on the first insulating layer, and a positive electrode active layer covering each of the first current collectors, the plurality of first current collectors spaced apart from each other;

a first filling film;

a separator;

a second filling film;

a negative plate comprising a second insulating layer, a plurality of second current collectors formed on the second insulating layer, and a negative electrode active layer covering the second current collectors, the plurality of second current collectors spaced apart from each other; and an electrolyte;

wherein each of the first current collectors corresponds to one of the second current collectors, the first filling film comprises a plurality of first openings, each of the first openings corresponds to one of the first current collectors, the first current collectors are embedded in the first openings, the second filling film comprises a plurality of second openings, each of the second openings corresponds to one of the second current collectors, the second current collectors are embedded in the second openings, the electrolyte is sealed in to each of the plurality of first openings and each of the plurality of second openings.

11. The flexible battery assembly of claim 10, wherein the positive plate comprises a plurality of first wires, each of the first wires is connected to one of the first current collectors; the negative plate comprises a plurality of second wires, each of the second wires is connected to one of the second current collectors.

12. The flexible battery assembly of claim 10, wherein a thickness of the first filling film is greater than or equal to a thickness of each of the first current collectors, a thickness of the second filling film is greater than a thickness of each of the second current collectors.

13. The flexible battery assembly of claim 10, wherein the flexible battery assembly further comprises a supporting film and a barrier film stacked on the supporting film, a side of the supporting film facing away from the barrier film is combined with the separator, a side of the barrier film facing away from the supporting film is combined with the second filling film, the supporting film comprises a plurality of third openings, each of the third openings corresponds to one of the first openings, the barrier film comprises a plurality of fourth openings, each of the fourth openings corresponds to one of the second openings, each of the fourth openings communicates with the corresponding third opening.

14. The flexible battery assembly of claim 13, wherein a size of each of the fourth openings is less than a size of the corresponding first opening, and also less than a size of the corresponding third opening.

15. The flexible battery assembly of claim 13, wherein the barrier film has a thickness of 7.5 μm to 35 μm.

16. The flexible battery assembly of claim 13, wherein a size of each of the fourth openings is in a range of 20 μm to 60 μm.

* * * * *